United States Patent [19]
Hibino

[11] 4,307,328
[45] Dec. 22, 1981

[54] AC MOTOR APPARATUS

[75] Inventor: Sadayoshi Hibino, Suzuka, Japan

[73] Assignee: Tokyo Shibaura Denki Kabushiki Kaisha, Kawasaki, Japan

[21] Appl. No.: 124,124

[22] Filed: Feb. 25, 1980

[30] Foreign Application Priority Data

Mar. 2, 1979 [JP] Japan .................. 54-24164

[51] Int. Cl.³ .............................................. H02P 7/46
[52] U.S. Cl. .................................. 318/809; 318/812; 318/440
[58] Field of Search ............... 318/807, 808, 809, 812, 318/440

[56] References Cited

U.S. PATENT DOCUMENTS

| | | | |
|---|---|---|---|
| 3,732,473 | 5/1973 | Johnston | 318/307 |
| 3,815,004 | 6/1974 | Sommeria | 318/440 |
| 3,859,577 | 1/1975 | Wiart | 318/808 X |
| 4,008,428 | 2/1977 | Waldmann | 318/807 X |
| 4,054,818 | 10/1977 | Risberg | 318/807 |
| 4,066,938 | 1/1978 | Turnbull | 318/808 X |
| 4,132,931 | 1/1979 | Okuyama | 318/809 X |

*Primary Examiner*—B. Dobeck
*Attorney, Agent, or Firm*—Oblon, Fisher, Spivak, McClelland & Maier

[57] ABSTRACT

First to fourth windings are fitted in the slots of each phase of a three-phase AC motor. Those windings are connected in series to silicon controlled rectifiers (SCRs), respectively. The first and second windings having the SCRs form a first antiparallel circuit and the third and fourth windings having the SCRs form a second antiparallel circuit. Three first antiparallel circuits are connected in a delta connection. Three second antiparallel circuits are connected in a star connection with a neutral input terminal. The output terminal of the first three phase AC power supply is coupled with the input terminal of the delta circuit of the first antiparallel circuits and has a voltage lagged by $\pi/2$ behind the first power supply voltage. The output terminal of the second power supply of a star connection with the neutral point output terminal is coupled with the input terminal of the star circuit of the second antiparallel circuit. The polarities of the winding and the SCR connected in series are so set that the AC motor is driven by a power supply with about 2f (f is the frequency of the power supply voltage). The SCRs are fired at the same firing angle.

3 Claims, 10 Drawing Figures

FIG. 6A  FIG. 6B
$e_R = E_r - E_s$
$e_S = E_s - E_t$
$e_T = E_t - E_r$
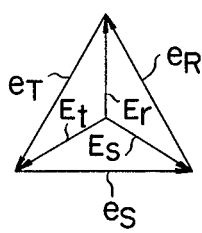
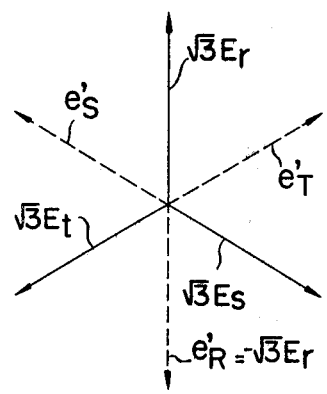
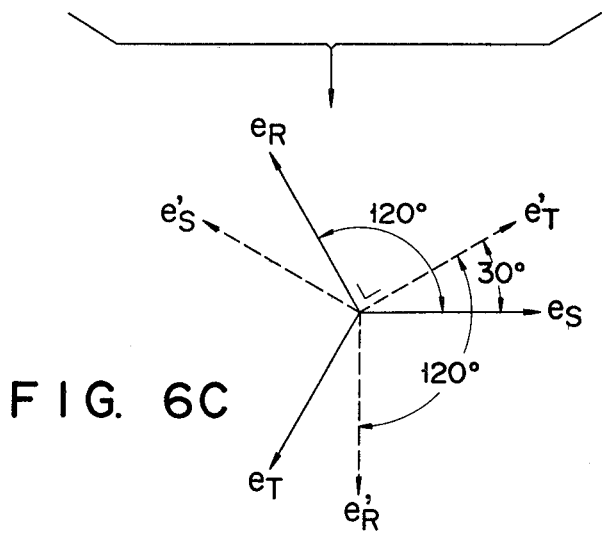
FIG. 6C

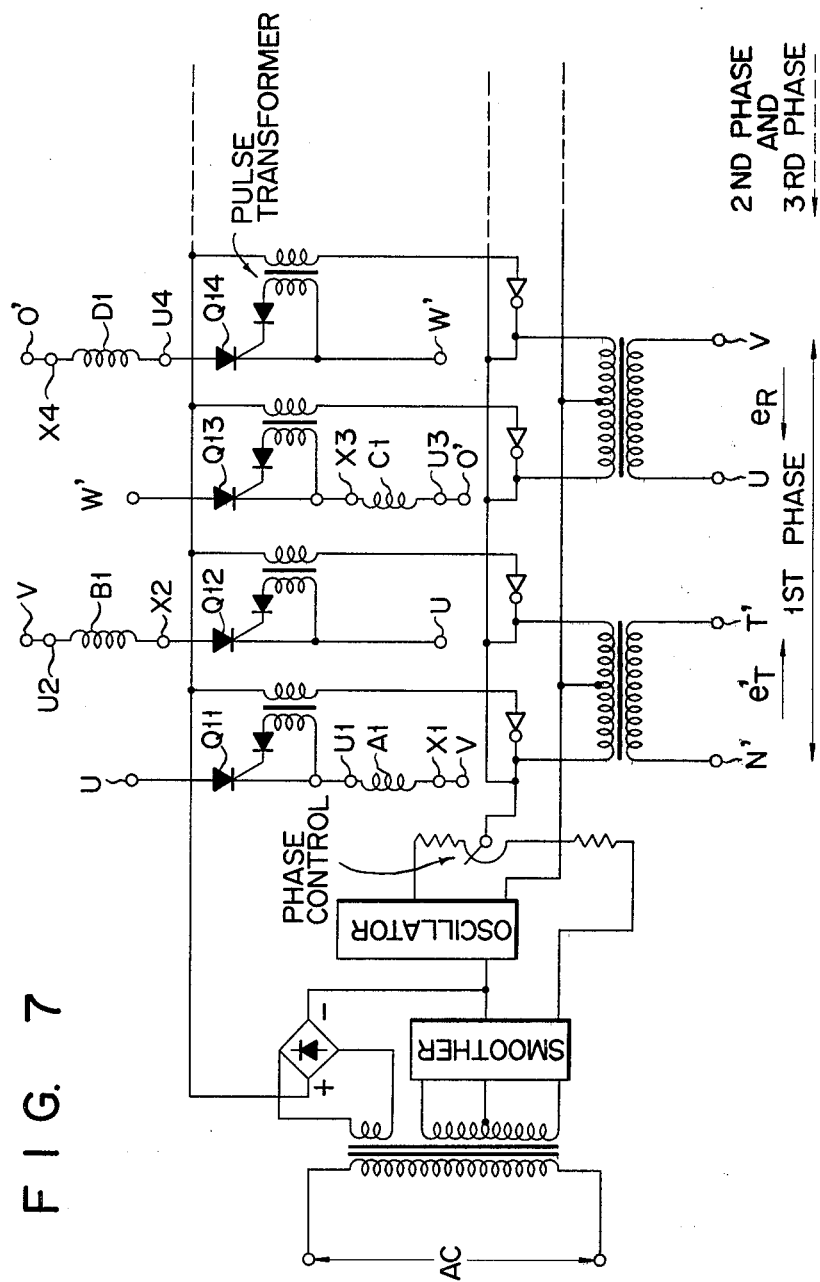

AC MOTOR APPARATUS

BACKGROUND OF THE INVENTION

The present invention relates to an AC motor apparatus and more particularly, an AC motor apparatus which can provide the larger number of revolutions than that determined by the number of poles.

The rotational speed of an AC motor is defined by a power source frequency f Hz and the number of poles P of the motor. The synchronous speed $n_s$, or the number of revolutions, of the AC motor is given by $n_s = 2f/P$ (r.p.s.). The number of real revolutions, however, is smaller than the $n_s$ by an amount of slip. When the power source frequency f is given, an AC motor with the maximum number of revolutions may be obtained with P=2. For the further larger number of revolutions, it is necessary to increase the number of revolutions of the motor mechanically. Alternatively, an output with a frequency larger than the commercial frequency (50 Hz or 60 Hz, for example) is produced by a motor generator or a static frequency converter and is applied to the AC motor. For obtaining the number of revolutions between those defined by P=2 and P=4, a mechanical speed increasing means, a mechanical speed decreasing means or a frequency converting means is used because the number of poles of the AC motor is inherently even. As the mechanical speed changing means, a belt type speed changing apparatus and a gear type speed changing apparatus are known but those are disadvantageous in the space occupied, life time, maintenance, noise and the like. As the frequency converting means, a rotary type or a static type frequency converter are known but those requires a larger space and have a high cost to manufacture. Particularly, the rotary type frequency converter needs a mechanical maintenance. For this, it has been desired that an AC motor is developed which can increase the number of revolutions of the motor by means of an electrical means free from the problems of space, maintenance, noise and cost. One of this type AC motors employs two windings for an armature to which rectifying elements are connected in series, respectively, and through which half-wave rectified currents flow. This proposal, however, can not eliminate the Dc components of the currents flowing through the windings. In this respect, it encounters a difficulty when it is reduced into a practical form.

SUMMARY OF THE INVENTION

Accordingly, an object of the invention is to provide an AC motor apparatus which can provide the revolutions of which the number is twice that of the conventional one, and does not need the mechanical speed changing apparatus and the frequency converting apparatus.

To achieve the above object, there is provided an AC motor apparatus comprising: a stator having a plurality of unit stator windings arranged in plural phases each phase having first to fourth stator windings; first to fourth silicon controlled rectifiers (SCRs) connected in series to the first to fourth stator windings, respectively; a control circuit to control the SCRs; and power supply means for supplying electric power to the first to fourth stator windings through the SCRs. The first to fourth stator windings in a phase are fitted in the same slots of an iron core constituting the stator and those have the same size and the same winding pitch. The first and second SCRs are connected in series with the first and second stator windings respectively with the same polarity as that of the corresponding stator windings. A series circuit including the first stator winding and the first SCR and another series circuit including the second stator winding and the second SCR are connected in antiparallel fashion to form a first circuit. The third and fourth SCRs are connected in series with the third and fourth stator windings with the opposite polarity to the corresponding stator windings. A series circuit including the third stator winding and the third SCR and another series circuit including the fourth stator winding and the fourth SCR are connected in antiparallel fashion to form a second circuit. A plurality of the first circuits forms a first interphase connected circuit and a plurality of the second circuits forms a second interphase connected circuit. The power supply means includes a first power supply for producing a first polyphase AC power and a second power supply for supplying a second polyphase AC power. The corresponding voltages of corresponding phases of the first and second power supply sources have a phase difference of about $\pi/2$. The first power supply source supplies electric power to the first interphase connected circuit and the second power supply source supplies electric power to the second interphase connected circuit. The first to fourth SCRs are controlled at a given firing angle.

Other objects and features of the invention will be apparent from the following description taken in connection with the accompanying drawings, in which:

BRIEF DESCRIPTION OF THE DRAWINGS

FIGS. 6A to 6C are vector diagrams illustrating voltages of the transformer and the output terminals shown in FIG. 1A; and FIG. 7 is a circuit diagram of a part of a gate control circuit shown in FIG. 1B.

DESCRIPTION OF THE PREFERRED EMBODIMENT

Figure 2:
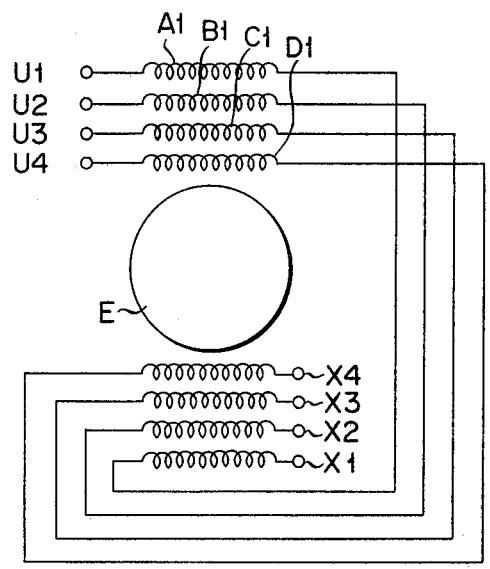
FIG. 2 shows an arrangement of first phase windings shown in FIG. 1B.
Figure 3:
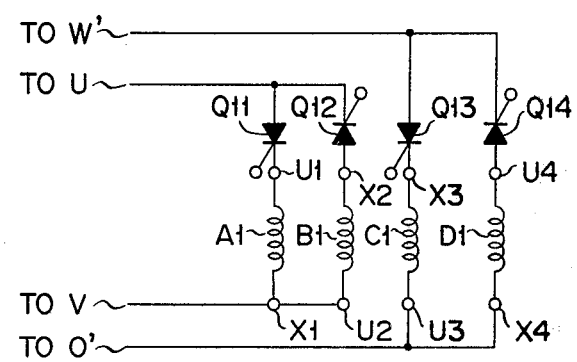
FIG. 3 shows a circuit diagram of the circuit including the first phase windings and silicon controlled rectifiers shown in FIG. 1B.

FIG. 2 shows an arrangement of a first phase stator winding of a two-pole three-phase induction motor. In the figure, reference symbol E designate a squirrel-cage rotor. In the figure, windings A1 to D1 with the same winding size and the winding pitch are fitted in the same slots of a stator core (not shown). U1 to U4 and X1 to X4 are winding start terminals and winding end terminals. In the specification, a direction from the winding start to the winding end of the winding will be referred to as a positive polarity. Similarly, the inverse direction will be referred to as a negative polarity. As shown in FIG. 3, an SCR Q11 is connected in series to the winding start terminal U1 with the polarity directed in the positive polarity of the winding A1. Similarly, an SCR Q12 is connected in series to the winding end X2 of winding B1 with the polarity directed in the positive polarity of the winding B1. The cathode of the SCR Q11 and the cathode of the SCR Q12 are connected to the terminal U. The winding end terminal X1 of the winding A1 and the winding start terminal U2 of the winding B1 are connected to the terminal V. A parallel circuit having a series circuit including the winding A1 and the SCR Q11 and another series circuit including the winding B1 and the SCR Q12, will be referred to as a first circuit. The SCR Q13 is connected to the winding end terminal X3 of the winding C1 with the polarity directed in the negative polarity of the winding C1. Similarly, an SCR Q14 is connected in series to the winding start terminal U4 of the winding D1 with the polarity directed in a negative polarity of the winding D1. The anode of the SCR Q13 and the cathode of the SCR Q14 are connected to the terminal W' and the winding start terminal U3 of the winding C1 and the winding end terminal X4 of the winding D1 are connected to the terminal 0'. A parallel circuit having a series circuit including the winding C1 and SCR Q13 and another series circuit including the winding D1 and the SCR Q14, will be called a second circuit.

Figure 1A:
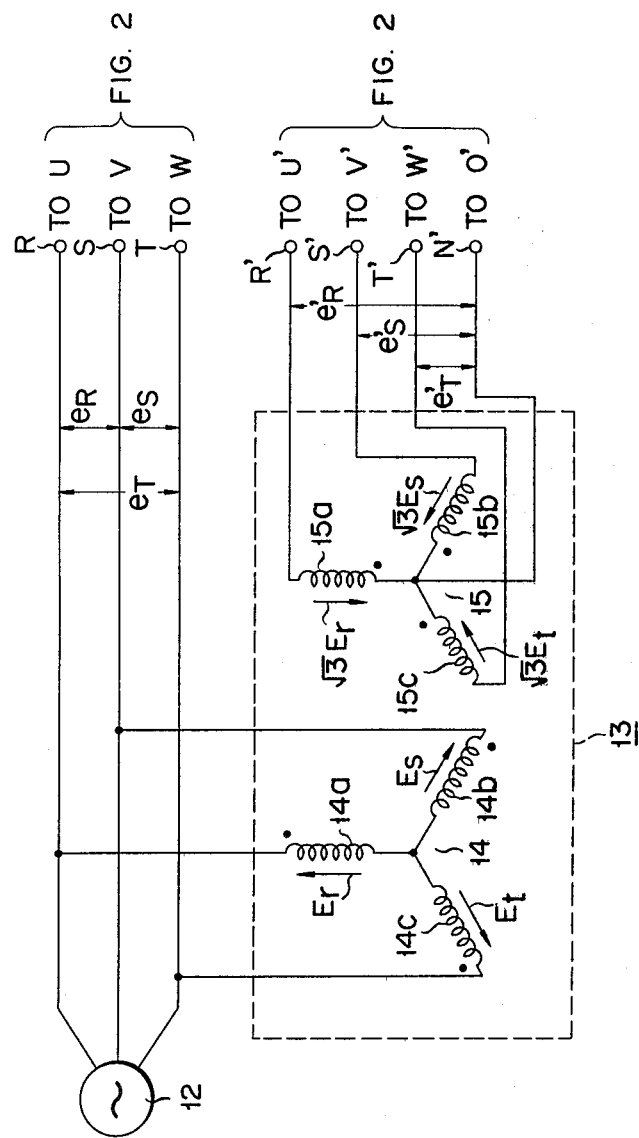
FIG. 1A is a circuit diagram of a power supply section of an AC motor apparatus which is an embodiment according to the invention.
Figure 1B:
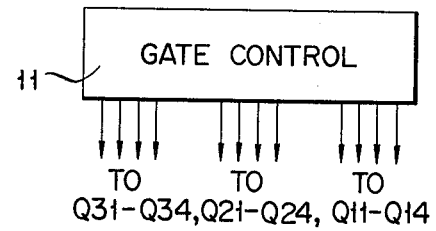
FIG. 1B is a circuit diagram of an AC motor apparatus as an embodiment according to the invention, which is supplied with electric power from the power supply section shown in FIG. 1.

A circuit arrangement of windings A2 to D2 and SCRs Q21 to Q24 in the second phase stator winding and a circuit arrangement of windings A3 to D3 and SCRs Q31 to Q34 in the third phase stator winding are both the same as that in the first phase stator winding as shown in FIG. 1B. As shown in FIG. 1B, the first circuits in the first to third phase stator windings are connected in a delta connection with input terminals U, V and W. The second circuits are connected in a star connection with input terminals U', V', W' and O'. The respective SCRs receives at the gates a pulse outputted from a gate control circuit 11 to be controlled at a given firing angle.

In FIG. 1A, the three-phase output from a commercial power source 12 are supplied through terminals R, S and T to the terminals U, V and W, respectively. The voltages between the respective pairs of the terminals R and S, S and T, and R and T are denoted as $e_R$, $E_S$ and $e_T$, respectively. The transformer 13 includes a primary winding 14 connected in the star connection and a secondary winding 15 connected in the star connection. The windings 14a to 14c of the primary winding 14 are connected at the positive ends marked by dots (·) to the terminals U, V and W, respectively. The windings 15a to 15c of the secondary winding 15 are connected at the negative ends to terminals R', S' and T' and at the positive ends marked by dots (·) connected to a terminal N'. The voltages between pairs of the terminals R' and N', S' and N', and T' and O' are denoted as $e'_R$, $e'_S$ and $e'_T$. The terminals R', S', T' and N' are coupled with the terminals U', V', W' and O', respectively. The turn ratio of the primary winding to the secondary winding is $1:\sqrt{3}$. Accordingly, the voltages $e_R$, $e_S$ and $e_T$, $e'_R$, $e'_S$ and $e'_T$ are equal to each other. Those voltages are interrelated with one another as shown by a vector diagram in FIG. 4. As shown, the voltages $e'_T$, $e'_R$ and $e'_S$ are retarded behind the voltages $e_R$, $e_S$ and $e_T$ by $\pi/2$.

Figure 5:
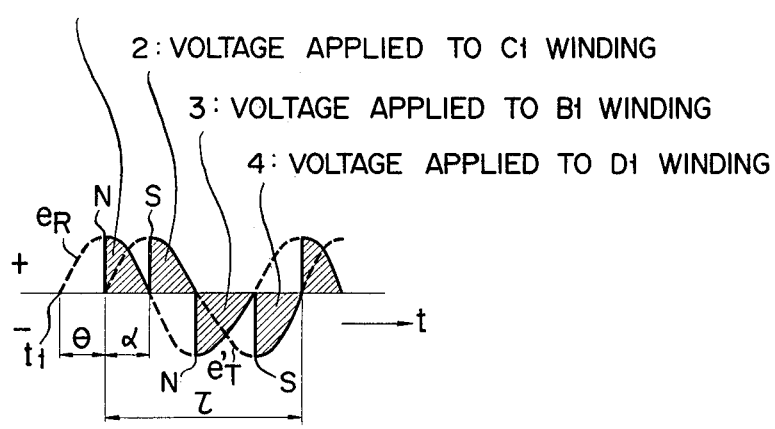
FIG. 5 shows waveforms of currents flowing through the stator windings shown in FIG. 2.

The operation of the AC motor apparatus thus constructed will be described referring to FIG. 5. For simplicity of explanation, explanation will be given placing an emphasis on the currents flowing through each winding of the first phase. The voltage $e_R$ is applied between the terminals U and V of the first circuit including the windings A1 and B1. As shown in FIG. 5, the voltage $e'_T$ is retarded by the voltage $e_R$ by $\pi/2$ with respect to time point $t_1$ where $e_R=0$. In the figure, $\theta$ represents a firing angle and $\alpha$ represents the conduction period of the SCR Q11. If $\theta = \pi/2$, current 1 (¼ wave) flows into the winding A1 during the half wave of the voltage $e_R$ thereby to form an N pole. When the voltage $e_R$ becomes negative, the SCR Q12 is made conductive at the firing angle $\pi/2$. The winding B1 is connected to the SCR Q12 with the opposite polarity of the winding A1. Accordingly, the magnetic pole formed by current 3 (¼ waveform) flowing into the winding B1 is also N. The voltage $e'_T$ retarded by $\pi/2$ behind the voltage $e_R$ is applied to the second circuit. The SCR Q13 is fired at the firing angle $\theta$ (in the figure, the firing angle $\theta$ and the conduction period $\alpha$ are both expressed by $\pi/2$), so that current 2 (¼ wave) flows into the winding C1 during the positive half wave period of the voltage $e'_T$. Since the winding C1 is connected to the SCR Q13 with the opposite polarity to the winding A1, the magnetic pole formed by the current 2 flowing through the winding C1 is the S pole. Then, upon application of the voltage $e'_T$, the SCR Q14 conducts at the firing angle $\theta = \pi/2$ during the negative period, so that current 4 (¼ wave) flows into the winding D1. In this case, the magnetic pole formed by the current 4 is the S pole because the winding D1 is connected to the SCR Q14 with the opposite polarity to the winding B1 connected to the SCR Q12. In the direction of time t, those currents sequentially form the following magnetic poles by the corresponding windings; N pole by the winding A1, S pole by the winding C1, N pole by the winding B1, and S pole by the winding D1. Thus, two pairs of N and S poles may be formed within one period of the power source frequency. The above description of the first phase is correspondingly applied to the remaining second and third phases.

In the conventional AC motor, the number n of revolutions given by $n = 2 \times f/P$ (r.p.s.) where f is a power source frequency, P is the number of poles and n is the maximum number of revolutions. On the other hand, the AC motor apparatus according to the invention can provide the number of n' of revolutions given by $$n' = 2 \times (2f)/P \text{ (r.p.s.)}$$

In other words, the number of revolutions obtained by the AC motor apparatus according to the invention is equal to that when 2f of the power source frequency is used.

The invention, which has been described by using the AC motor with three-phase two pole windings, is of course applicable for the AC motors with 4 or more poles, similarly. The invention is also applicable for the combination of a two-phase power source with the phase difference of $\pi/2$, and a single-phase motor. The firing angle, which is $\pi/2$ in the above-mentioned embodiment, may be within a range of $0 < \theta < \pi$. The second power source, which has a phase difference of $\pi/2$ with respect to the first power source, is not necessarily the transformer alone, but a proper phase modifier or a capacitor. Additionally, if necessary, the proper number of SCRs may be used with a series or parallel connection.

Figure 4:
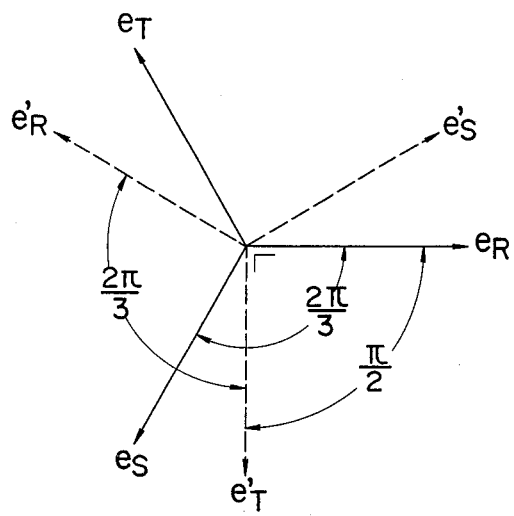
FIG. 4 is a vector diagram illustrating voltages at the terminals of the power supply section shown in FIG. 1A.

As shown in FIG. 4, the voltages $e_R$ and $e'_T$ are different from each other by $\pi/2$. This will be described in more detail with reference to FIGS. 6A to 6C. In FIG. 1A, characters Er, Es, Et, $e_R$, $e_S$, $e_T$, $e'_R$, $e'_S$ and $e'_T$ represent voltage vectors, although no symbol representing a vector is attached to them. The voltage vectors of the respective windings of the primary winding 14 of the transformer are illustrated as in FIG. 6A. The voltage vectors of the respective windings of the secondary winding 15 are illustrated as in FIG. 6B. When those vectors are combined with the vector $e_S$ as reference, the relation of those vectors are illustrated with a vector diagram shown in FIG. 6C. As seen from FIG. 6C, the voltage vector $e'_T$ is retarded by $\pi/2$ behind the voltage vector $e_R$.

Figure 1B:
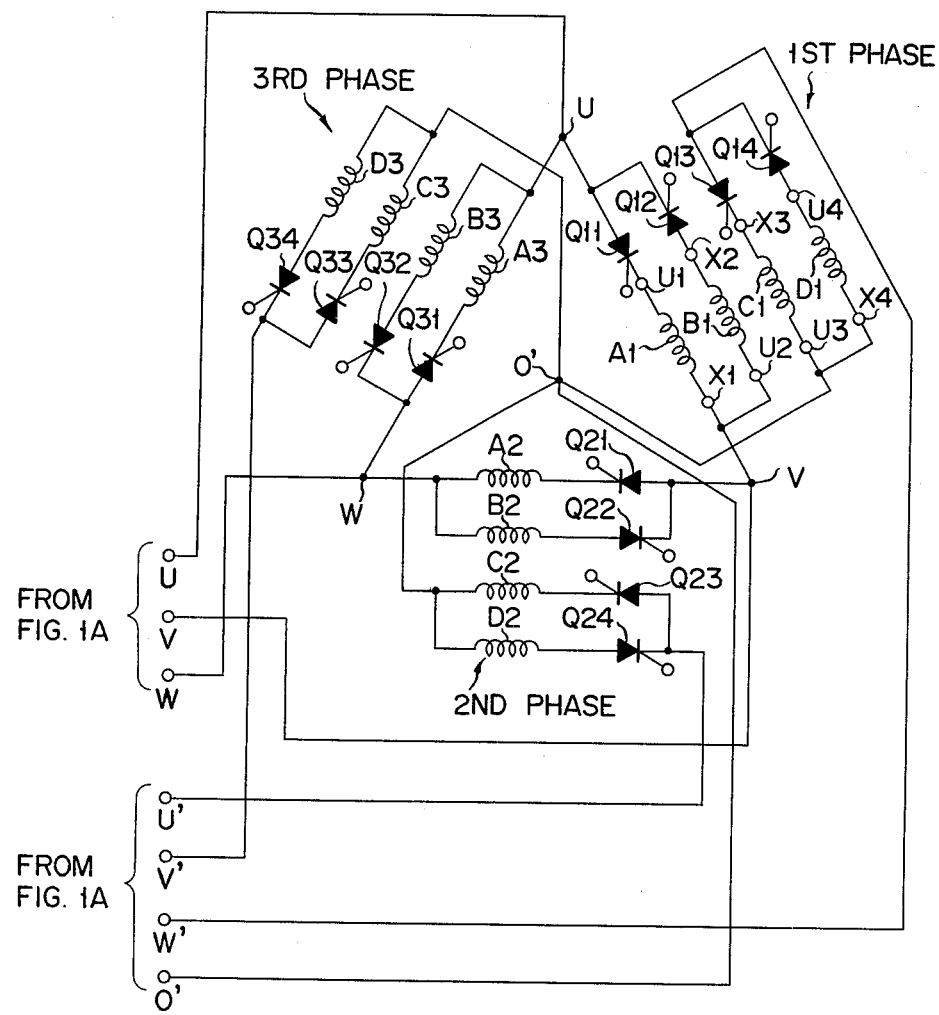

The circuit construction of the gate control circuit 11 shown in FIG. 1B is illustrated in FIG. 7. In FIG. 7, only a part of the gate control circuit 11 which provides gate control pulses to the first phase section of the motor is illustrated. The reason for this is that the remaining parts of the circuit will easily be inferred from the construction of FIG. 7. In the figure, the components except the windings A1 to D1 are included in the gate control circuit 11. The terminal connections and the components in FIG. 7 are designated by the same reference symbols as those in FIG. 1. Accordingly, no further explanation of those will be given.

As described above, the invention may easily realize an AC motor apparatus with the number of revolutions required for the load. A conventional vaccum cleaner uses a commutator mortor with a brush. However, when the invention is applied to the cleaner, such a motor may be replaced by a brushless induction motor.

What is claimed is:

1. An AC motor apparatus comprising:
    a stator having a plurality of unit stator windings arranged in plural phases each phase having first to fourth stator windings;
    first to fourth silicon controlled rectifiers (SCRs) connected in series to said first to fourth stator windings, respectively;
    a control circuit to control said SCRs; and
    power supply means for supplying electric power to said first to fourth stator windings through said SCRs; wherein said first to fourth stator windings in a phase are fitted in the same slots of an iron core constituting said stator and those have the same size and the same winding pitch, said first and second SCRs are connected in series with said first and second stator windings respectively with the same polarity as that of said corresponding stator windings, a series circuit including said first stator winding and said first SCR and another series circuit including said second stator winding and said second SCR are connected in anti-parallel fashion to form a first circuit, said third and fourth SCRs are connected in series with said third and fourth stator windings with the opposite polarity to said corresponding stator windings, a series circuit including said third stator winding and said third SCR and another series circuit including said fourth stator winding and said fourth SCR are connected in antiparallel fashion to form a second circuit, a plurality of said first circuits forms a first interphase connected circuit and a plurality of said second circuits forms a second interphase connected circuit, said power supply means includes a first power supply for producing a first polyphase AC power and a second power supply for supplying a second polyphase AC power, the corresponding voltages of corresponding phases of said first and second power supply sources have a phase difference of about $\pi/2$, said first power supply supplies electric power to said first interphase connected circuit and said second power supply supplies electric power to said second interphase connected circuit, and said first to fourth SCRs are controlled at a given firing angle.

2. An AC motor apparatus according to claim 1, wherein said first interphase connected circuit is a three-phase delta connection circuit, said second interphase connected circuit is a three phase star connection circuit with an input terminal continuous to a neutral point; said first power supply is a three-phase power supply, said second power supply is a transformer having a primary winding of a star connection coupled with said three-phase AC power supply and a secondary winding of a star connection with a neutral output terminal, the polarity of the voltage at the neutral point of the secondary winding is opposite to that of the voltage at the neutral point of the primary winding, the turn ratio of the primary winding to the secondary winding is $1:\sqrt{3}$; the output terminal of said first power supply is coupled with the input terminal of said first interphase connected circuit of the delta connection and the output terminal of said second power supply is connected to the input terminal of said second interphase connected circuit of the star connection.

3. An AC motor apparatus according to claim 1, wherein said first to fourth SCRs of each phase are each fired at $\pi/2$, of firing angle.

* * * * *